J. H. ALLEN.
TOY.
APPLICATION FILED NOV. 20, 1909.
975,197.
Patented Nov. 8, 1910.
2 SHEETS—SHEET 1.
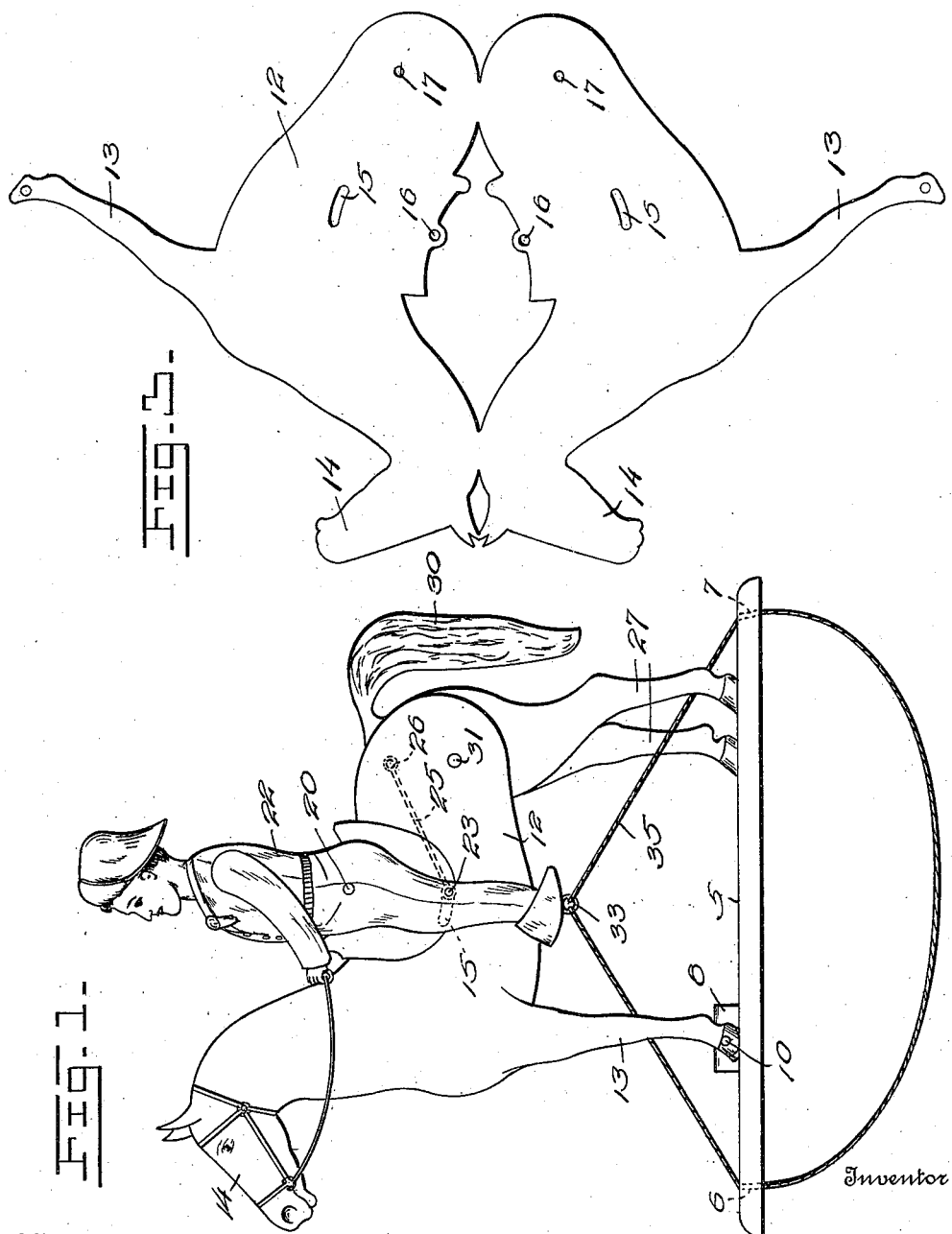
Witnesses
L. L. Armstrong
M. L. Lowe
Inventor
John H. Allen,
By Woodward & Chandler.
Attorneys

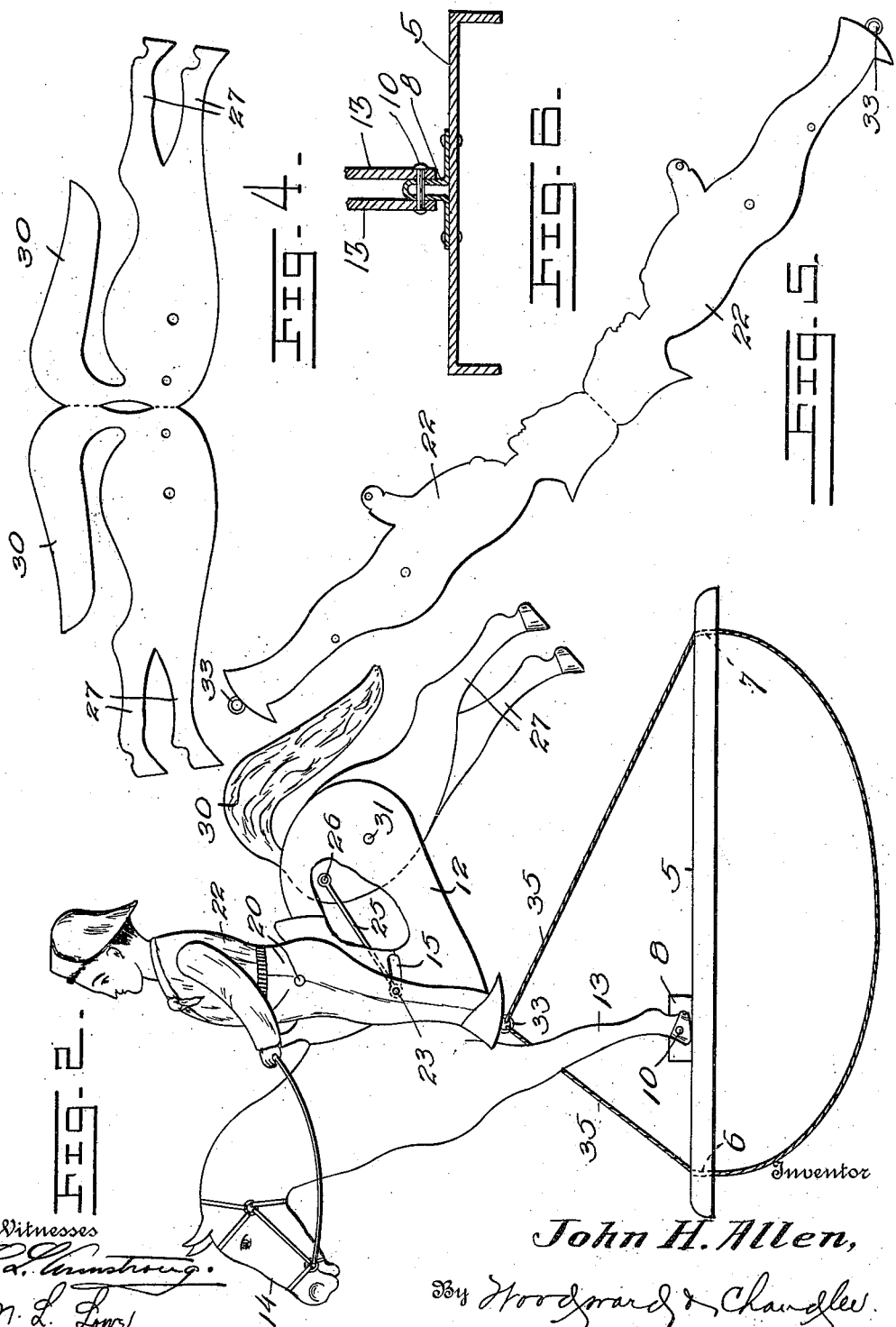

UNITED STATES PATENT OFFICE.

JOHN H. ALLEN, OF MOORE PARK, MANITOBA, CANADA.

TOY.

975,197.  Specification of Letters Patent.  Patented Nov. 8, 1910.

Application filed November 20, 1909. Serial No. 529,101.

*To all whom it may concern:*

Be it known that I, JOHN H. ALLEN, a subject of the King of England, and residing at Moore Park, in the Province of Manitoba and Dominion of Canada, have invented certain new and useful Improvements in Toys, of which the following is a specification.

This invention has relation to certain new and useful improvements in toys.

The object of my invention is to provide a figure toy so arranged that several members or parts thereof may be synchronously actuated to provide an entertaining and amusing diversion.

With the above and other objects in view, the present invention consists in the combination and arrangement of parts as will be hereinafter more fully described and particularly pointed out in the appended claims, it being understood that changes in the specific structure shown and described may be made within the scope of the claims without departing from the spirit of the invention.

In the drawings forming a part of this specification and in which like numerals of reference indicate similar parts in the several views, Figure 1 shows an elevational view of the toy in its normal position. Fig. 2 shows an elevational view of the toy in its extreme tilted position. Fig. 3 shows a top view of the cut out blank of the body of the animal. Fig. 4 shows a top view of the cut out blank of the rear legs and the tail of the animal. Fig. 5 shows a view of the cut out blank of the rider. Fig. 6, is a cross-section on the line 6—6 of Fig. 1, the four legs of the horse being partly broken away.

The aim of my invention is to provide a jointed, cut out figure toy representing a horse and rider, so united that the two figures, as well as the rear legs and tail of the animal can be synchronously actuated, in imitation of a rearing, plunging horse, trying to unseat its rider.

In the drawings the numeral 5 designates a flat sheet metal base member having its edges flanged to strengthen the same and provided with the apertures 6 and 7. Secured near one end to this base member is the corrugated metal member or ears 8 which is perforated and carries the pin 10.

The body of the horse is in two similar connected sections 12 provided with the fore legs 13 and the head 14. The body is slotted as shown at 15 and is provided with two pin apertures marked 16 and 17. The legs 13 also have an aperture arranged to receive the pin 10 so that the body of the animal is pivotally held to the member or ear 8.

Held within the aperture 16 is the pin 20 which supports the figure 22 of the rider. The body of the rider 22 is connected, but the legs of the rider are spread so that the figure may be placed astride of the body of the horse. Held within the legs of the rider is the pin 23 working within the slots 15, and held upon this pin 23 between the body members of the horse is the connecting bar 25 secured to the pin 26 carried at the upper end of the rear legs of the horse. The animal's tail 30 is secured to and forms a part of the rear or hind legs of the animal. Held within the aperture 17, is the pin 31 which pivotally supports the rear legs of the animal.

From the foregoing it will be understood that the body of the horse is pivotally secured to the member 10, that the figure of the rider is pivotally held to the pin 20, and that the rear legs 27 are pivotally held between the body portions of the animal. As the figure 22 and the rear legs 27 are connected by means of the bar 25 they are operated in unison.

Within the feet of the rider, is an opening 33 and passing through this opening 33 and the apertures 6 and 7 is the operating strand 35. In pulling downward the end of the strand passing through the aperture 6, the rider is first moved as are the connected rear legs of the animal, while simultaneously the body of the animal is tilted forward. In properly operating the strand 35 the animal may be made to kick, or by a series of short jerks the animal may be moved to imitate a gallop.

The same general construction may be applied to figures of various kinds in which a rider is pivoted to a pivotally held animal, the figures being actuated by means of a strand secured to the rider.

The three blanks may be each formed at one operation being stamped out of sheet metal. The toy is simple and inexpensive in construction and forms a durable and entertaining device.

What is claimed is:

1. In combination, a base, a body having fore legs pivotally secured to said base, rear legs pivotally secured to said body, a rider pivotally secured to said body, means for limiting the movement of said rider and a pliable connection secured to said rider for synchronously actuating said body and rider.

2. In combination, a base, a body having fore legs pivotally secured to said base, a rider pivotally secured to said body, rear legs pivotally secured to said body, means to pivotally connect said rear legs to said rider, means for limiting the movement of said rider and means connected to said rider for causing a movement of said rider and rear legs.

3. The combination with a suitable base, of a body having fore legs pivotally secured to said base, rear legs pivotally secured to said body, a rider pivotally secured to said body means to limit the pivotal movement of said rider means on the base and connected to the rider for moving said rider and means to pivotally connect said rear legs to said rider.

4. The combination with a suitable base, of an ear secured to said base, a member in the form of an animal's body having fore legs pivotally secured to said base, rear legs pivotally secured to said body, a rider pivotally secured to said body, said body being slotted, a pin carried by said rider and guided within said slot, a connection extending from said pin to said rear legs to pivotally connect these parts, and a pliable connection extending from said rider for synchronously actuating said body, rider and rear legs.

5. The combination with a base having oppositely positioned apertures, of an ear secured to said base, a member representing the body of an animal having fore legs pivotally secured to said ear, a rider pivotally secured to said body, a pin carried by said rider working within a suitable slot of said body rear legs pivotally secured to said body, means to pivotally connect said rear legs to said pin, and a pliable connection passing through said aperture and secured to said rider for synchronously actuating said body, rider, and rear legs.

In testimony whereof I affix my signature, in presence of two witnesses.

JOHN H. ALLEN.

Witnesses:
　JOSEPH N. SCOTT,
　EDWARD DEARING.